United States Patent
Carpio et al.

(10) Patent No.: US 8,624,989 B2
(45) Date of Patent: Jan. 7, 2014

(54) SYSTEM AND METHOD FOR REMOTELY PERFORMING IMAGE PROCESSING OPERATIONS WITH A NETWORK SERVER DEVICE

(75) Inventors: Fredrik Carpio, San Diego, CA (US); Nikolaos Georgis, San Diego, CA (US); Yi Zhou, San Diego, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 443 days.

(21) Appl. No.: 12/217,021

(22) Filed: Jul. 1, 2008

(65) Prior Publication Data
US 2010/0002102 A1    Jan. 7, 2010

(51) Int. Cl.
*H04N 5/228* (2006.01)
*H04N 5/262* (2006.01)
*G06K 9/40* (2006.01)

(52) U.S. Cl.
USPC .................. 348/222.1; 348/239; 382/254

(58) Field of Classification Search
USPC ........ 348/222.1, 223.1, 207.1, 211.99, 211.1, 348/211.2, 239, 218.1, 208.99, 208.4, 348/229.1; 382/232, 254
See application file for complete search history.

(56) References Cited

U.S. PATENT DOCUMENTS

| | | | |
|---|---|---|---|
| 6,011,547 A | 1/2000 | Shiota et al. | |
| 6,628,899 B1 * | 9/2003 | Kito | 396/56 |
| 6,937,135 B2 | 8/2005 | Kitson et al. | |
| 6,977,743 B2 * | 12/2005 | Carlton | 358/1.15 |
| 7,206,019 B2 * | 4/2007 | Suga et al. | 348/211.11 |
| 7,768,532 B2 * | 8/2010 | Eto et al. | 345/629 |
| 2001/0017656 A1 * | 8/2001 | Araki et al. | 348/211 |
| 2002/0051074 A1 * | 5/2002 | Kawaoka et al. | 348/376 |
| 2002/0102966 A1 | 8/2002 | Lev et al. | |
| 2003/0108252 A1 | 6/2003 | Carrig | |
| 2004/0117427 A1 * | 6/2004 | Allen et al. | 709/200 |
| 2004/0119851 A1 * | 6/2004 | Kaku | 348/239 |
| 2004/0174434 A1 * | 9/2004 | Walker et al. | 348/211.3 |
| 2004/0218834 A1 | 11/2004 | Bishop et al. | |
| 2004/0263629 A1 * | 12/2004 | Ambiru et al. | 348/207.1 |

(Continued)

FOREIGN PATENT DOCUMENTS

| | | | | |
|---|---|---|---|---|
| CN | 1409918 A | | 4/2003 | |
| JP | 2008-067316 | * | 3/2008 | H04N 7/173 |
| WO | WO 01/45388 A2 | | 6/2001 | |
| WO | WO03001435 A1 | | 1/2003 | |

OTHER PUBLICATIONS

Daniel Wagner, Dieter Schmalstieg, First Steps Towards Handheld Augmented Reality, Proceedings of the Seventh Ieee International Symposium on Wearable Computers, Oct. 21-23, 2003. Piscataway, NJ, USA, IEEE, pp. 127-135, XP010673786, ISBN: 978-0-7695-2034-6.

(Continued)

*Primary Examiner* — Kelly L Jerabek
(74) *Attorney, Agent, or Firm* — Sony Corporation

(57) ABSTRACT

A system and method for efficiently performing image processing operations includes a camera device that is configured to automatically capture an image sequence of related offset images that correspond to a particular selected photographic target. The camera device then transmits the captured image sequence to an image processing server through an electronic network. The image processing server perform one or more processing-intensive operations upon the received image sequence to thereby produce an enhanced image that may then be transmitted to any appropriate image destination.

19 Claims, 12 Drawing Sheets

(56) References Cited

U.S. PATENT DOCUMENTS

| | | |
|---|---|---|
| 2006/0136559 A1 | 6/2006 | Morris |
| 2006/0174206 A1* | 8/2006 | Jung et al. .................. 715/751 |
| 2008/0046502 A1* | 2/2008 | Kamei et al. ................ 709/201 |
| 2009/0268060 A1* | 10/2009 | Georgis et al. ............ 348/240.1 |
| 2011/0080487 A1* | 4/2011 | Venkataraman et al. .. 348/218.1 |

OTHER PUBLICATIONS

Choong S. Boon, Onur G. Guleryuz, Toshiro Kawahara, and Yoshinori Suzuki, Sparse Super-Resolution Reconstructions of Video From Mobile Devices in Digital TV Broadcast Applications—PS-2006-0117, http://www.docomolabs-usa.com/pdf/PS-2006-0117.pdf, Jan. 17, 2006, pp. 1-12.

Juergen Gausemeier and Beat Bruederlin, Development of a Real Time Image Based Object Recognition Method for Mobile AR-Devices, XP-002488965, 2003, The Association for Computing Machinery, Inc. XP002488965, ISBN: 978-58113-643-2, pp. 133-139.

Marc Directo, Shahram Shirani, David Capson, Wireless Camera Network for Image Superresolutiori, Electrical and Computer Engineering, Ont., Canada, May 2-5, 2004, Piscataway, NJ, USA,IEEE,US,pp. 681-684, vol. 2, XP010733538, DOI:10.1109/CCECE.2004.1345204,ISBN:978-0-7803-8253-4.

Min Kyu Park et al, Super-Resolution Image Reconstruction: A Technical Overview, IEEE Signal Processing Magazine, IEEE Service Center, Piscataway, NJ, US, vol. 20, No. 3, May 1, 2003, pp. 21-36, XP011097476.

* cited by examiner

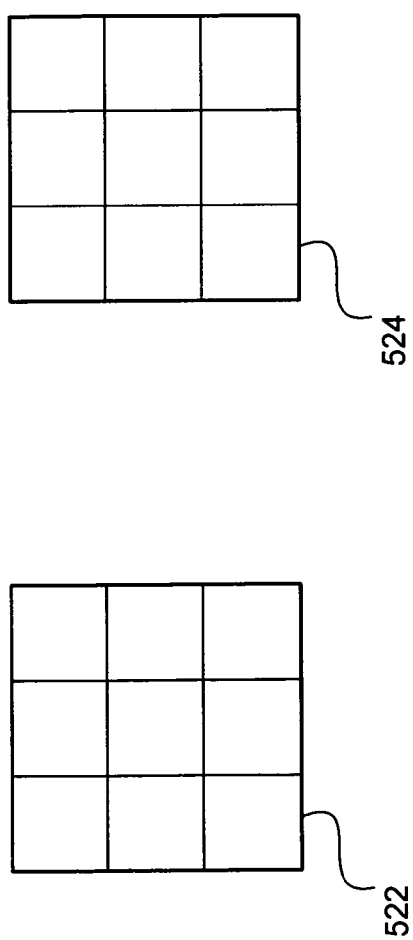
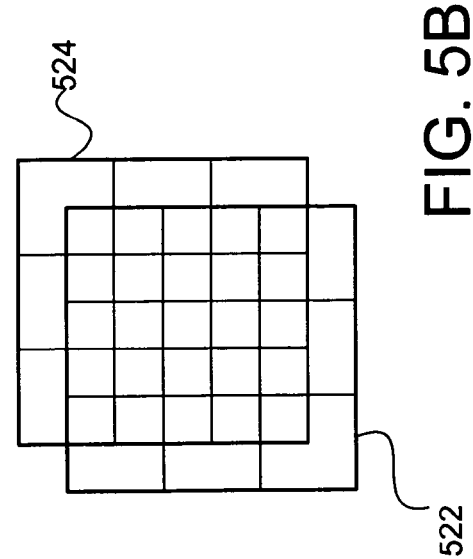

SYSTEM AND METHOD FOR REMOTELY PERFORMING IMAGE PROCESSING OPERATIONS WITH A NETWORK SERVER DEVICE

BACKGROUND SECTION

1. Field of the Invention

This invention relates generally to techniques for handling image data, and relates more particularly to a system and method for efficiently performing image processing operations.

2. Description of the Background Art

Implementing effective methods for handling image data is a significant consideration for designers and manufacturers of contemporary electronic devices. However, effectively handling image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures digital image data may benefit from an effective implementation because of the large amount and complexity of the digital data involved.

Due to growing demands on system resources and substantially increasing data magnitudes, it is apparent that developing new techniques for handling image data is a matter of concern for related electronic technologies. Therefore, for all the foregoing reasons, developing effective systems for handling image data remains a significant consideration for designers, manufacturers, and users of contemporary electronic devices.

SUMMARY

In accordance with the present invention, a system and method are disclosed for efficiently performing image processing operations. In one embodiment, a camera device initially launches a camera application program to begin camera functions in an enhanced image capture mode. A camera user frames a selected photographic target by using a viewfinder of the camera. The camera user then activates an image capture button mounted on the exterior of the camera. The camera automatically captures an image sequence in response to the activation of the image capture button. The image sequence may include any desired number of similar, but slightly offset, images. The camera then transmits the captured image sequence to an image processing server through an electronic network.

The image processing server locally stores the received image sequence, and then advantageously performs appropriate image processing operations on the received image sequence to produce a corresponding enhanced image. For example, in certain embodiments, the image processing operations may include a super-resolution processing procedure that requires a substantial amount of processing resources from the image processing server. The image processing server may then send the enhanced image to any appropriate image destination. For example, the image processing server may send the enhanced image back to the camera device, or may alternately send the enhanced image to a remote computer destination in the electronic network.

The image data captured by the camera device may require image processing that consumes a substantial amount of processing resources. In accordance with the present invention, instead of locally performing various resource-intensive processing operations, the camera device provides the captured image data to the image processing server that is configured to possess a significant amount of processing and memory resources. The image processing server may thus perform image processing functions on behalf of the camera device. The camera device may therefore be implemented in a more economical manner, and may also perform important tasks other than the foregoing image processing functions. The present invention therefore provides an improved system and method for efficiently performing image processing operations.

BRIEF DESCRIPTION OF THE DRAWINGS

FIGS. 5A and 5B are diagrams illustrating an image processing procedure, in accordance with one embodiment of the present invention;

DETAILED DESCRIPTION

The present invention relates to an improvement in image data handling techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently performing image processing operations, and includes a camera device that is configured to automatically capture an image sequence of related offset images that correspond to a particular selected photographic target. The camera device then transmits the captured image sequence to an image processing server through an electronic network. The image processing server perform one or more processing-intensive operations upon the received image sequence to thereby produce an enhanced image that may then be transmitted to any appropriate image destination.

Figure 1A:
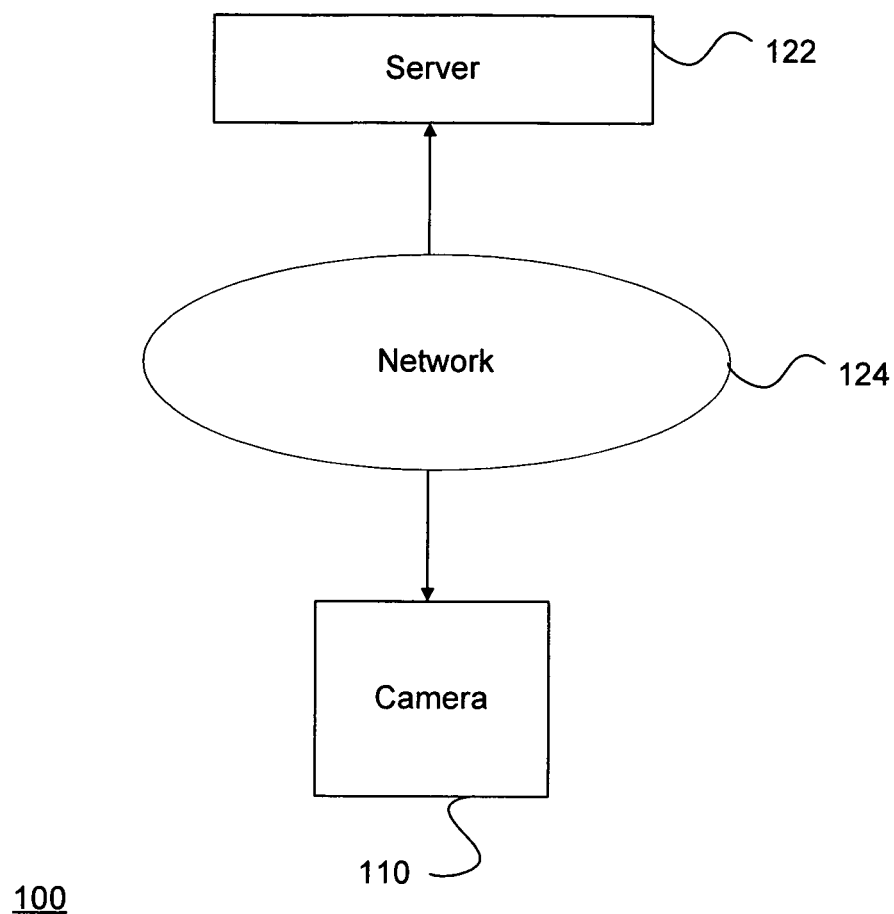
FIG. 1A is a block diagram for one embodiment of an image processing system, in accordance with the present invention.

Referring now to FIG. 1A, a block diagram of an image processing system 100 is shown, in accordance with one embodiment of the present invention. In the FIG. 1A embodiment, image processing system 100 may include, but is not limited to, a camera 110, a server 122, and a network 124.

In alternate embodiments, image processing system 100 may be implemented by utilizing components and configurations in addition to, or instead of, certain of those components and configurations discussed in conjunction with the FIG. 1A embodiment. For example, for purposes of illustration, a single camera 110 and server 122 are shown in FIG. 1A. However, in actual practice, principles of the disclosed invention may readily be performed by any number of different cameras and/or servers.

In the FIG. 1A embodiment, camera 110 may be implemented in any effective manner for capturing image data. In alternate embodiments, camera 110 may be implemented as any other type of appropriate electronic device. For example, in certain embodiments, camera 110 may be alternately implemented as a cellular telephone, a digital still camera, a video camcorder, a personal computer, a personal digital assistant (PDA), a scanner, or any type of stationary or portable consumer-electronics device.

In certain embodiments, image data captured by camera 110 may require image processing that consumes a substantial amount of processing resources. In accordance with the present invention, instead of locally performing various resource-intensive processing operations, camera 110 may provide the captured image data to server 122 through network 124. In certain embodiments, server 122 may be configured to include a significant amount of processing and memory resources. Server 122 may thus perform various image processing function on the received image data on behalf of camera 110.

Camera 110 may therefore be implemented in a more economical manner, and may also perform important tasks other than the foregoing image processing functions. In the FIG. 1A embodiment, network 124 may be implemented to include any desired types of wired or wireless electronic networks including, but not limited to, the Internet. After server 122 completes any required image processing, the image data may be provided to a designated data destination including, but not limited to, camera 110 or another computer entity in network 124. Further details regarding the implementation and utilization of the FIG. 1A image processing system 100 are discussed below in conjunction with FIG. 2-10.

Figure 1B:
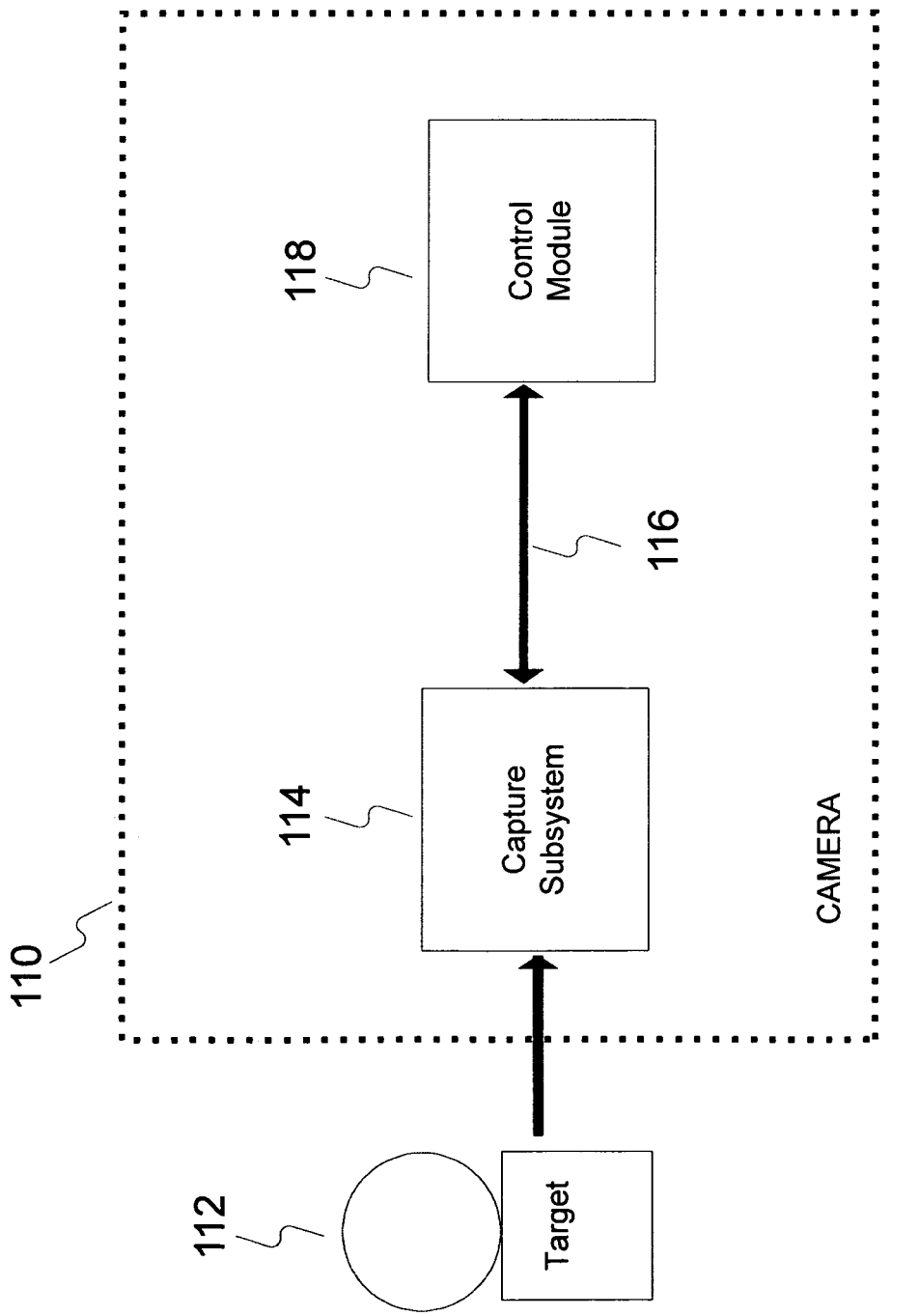
FIG. 1B is a block diagram for one embodiment of the camera of FIG. 1A, in accordance with the present invention.

Referring now to FIG. 1B, a block diagram for one embodiment of the FIG. 1A camera 110 is shown, in accordance with the present invention. In the FIG. 1B embodiment, camera 110 may include, but is not limited to, a capture subsystem 114, a system bus 116, and a control module 118. In the FIG. 1B embodiment, capture subsystem 114 may be optically coupled to a photographic target 112, and may also be electrically coupled via system bus 116 to control module 118.

In alternate embodiments, camera device 110 may include other components in addition to, or instead of, certain of those components discussed in conjunction with the FIG. 1B embodiment. In addition, in certain embodiments, the present invention may alternately be embodied in any appropriate type of electronic device other than the camera device 110 of FIG. 1B. For example, camera device 110 may alternately be implemented as an imaging device, a cellular telephone, a scanner, a video camcorder, a computer device, or a consumer electronics device.

In the FIG. 1B embodiment, once a system user has focused capture subsystem 114 on target 112 and requested camera 110 to capture image data corresponding to target 112, then control module 118 may instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
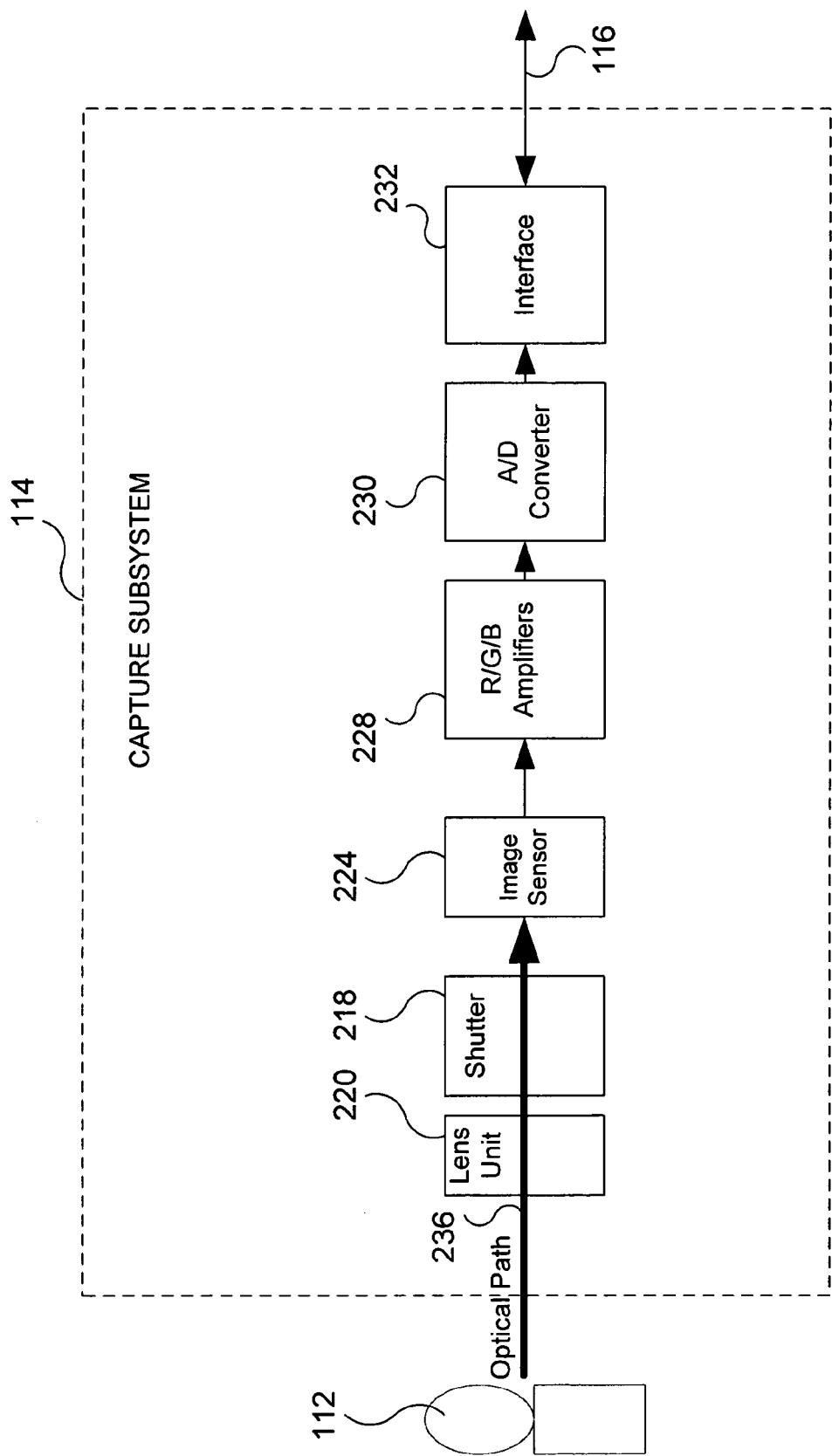
FIG. 2 is a block diagram for one embodiment of the capture subsystem of FIG. 1B, in accordance with the present invention.

Referring now to FIG. 2, a block diagram for one embodiment of the FIG. 1B capture subsystem 114 is shown, in accordance with the present invention. In the FIG. 2 embodiment, capture subsystem 114 comprises, but is not limited to, a shutter 218, a lens unit 220, an image sensor 224, red, green, and blue (R/G/B) amplifiers 228, an analog-to-digital (A/D) converter 230, and an interface 232. In alternate embodiments, capture subsystem 114 may readily include other components in addition to, or instead of, certain those components discussed in conjunction with the FIG. 2 embodiment.

In the FIG. 2 embodiment, capture subsystem 114 captures image data corresponding to target 112 via reflected light impacting image sensor 224 along optical path 236. Image sensor 224, which may include a charged-coupled device (CCD), may responsively generate a set of image data representing the target 112. The image data may then be routed through red, green, and blue amplifiers 228, A/D converter 230, and interface 232. From interface 232, the image data passes over system bus 116 to control module 118 for appropriate processing and storage.

Figure 3:
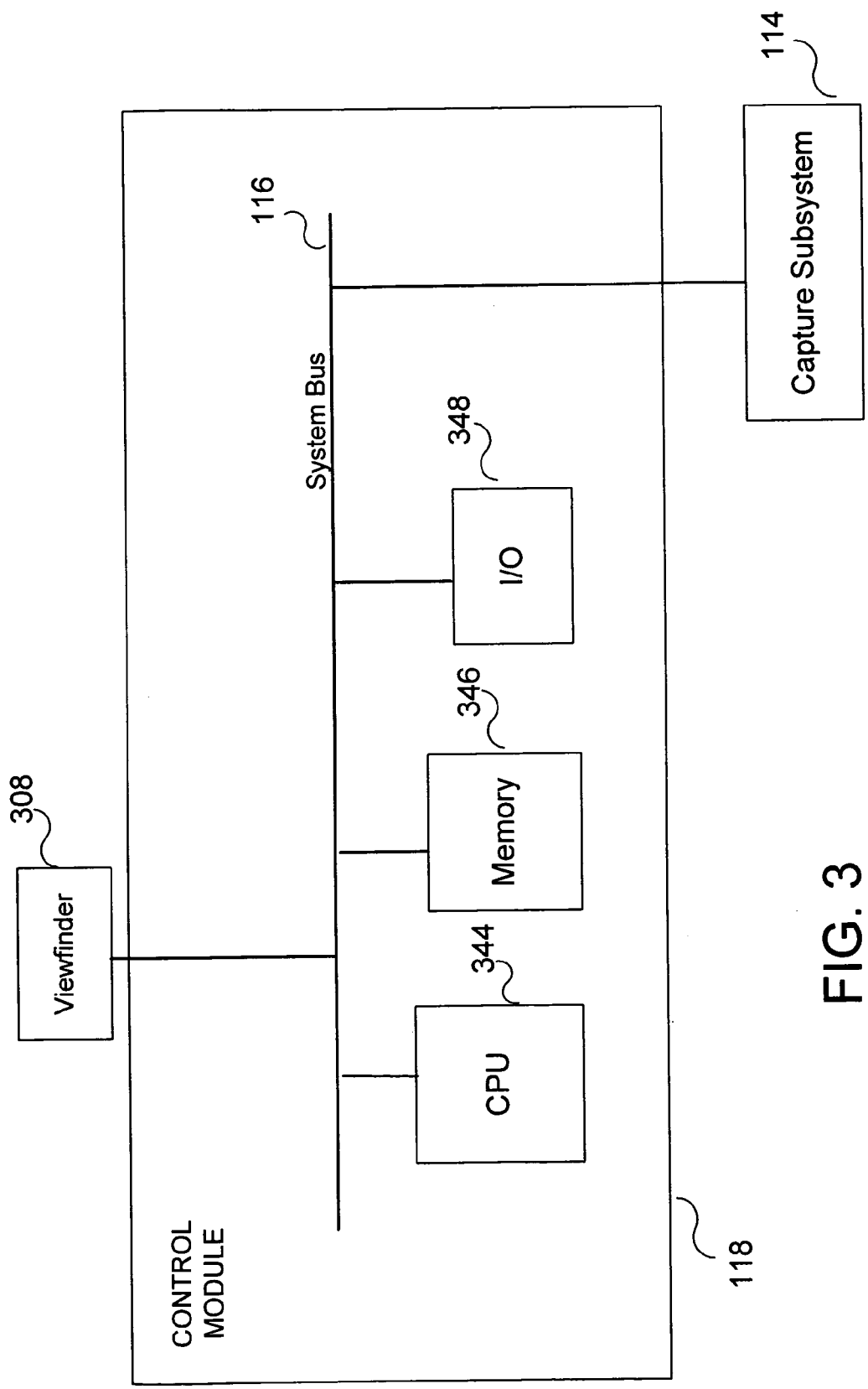
FIG. 3 is a block diagram for one embodiment of the control module of FIG. 1B, in accordance with the present invention.

Referring now to FIG. 3, a block diagram for one embodiment of the FIG. 1B control module 118 is shown, in accordance with the present invention. In the FIG. 3 embodiment, control module 118 includes, but is not limited to, a viewfinder 308, a central processing unit (CPU) 344, a memory 346, and one or more input/output interface(s) (I/O) 348. Viewfinder 308, CPU 344, memory 346, and I/O 348 are each coupled to, and communicate, via common system bus 116 that also communicates with capture subsystem 114. In alternate embodiments, control module 118 may include other components in addition to, or instead of, certain of those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. For example, I/O 348 may include any effective means of communicating with the FIG. 1A server 122 by utilizing wireless or wired techniques. The operation and implementation of control module 118 are further discussed below in conjunction with FIG. 4.

Figure 4:
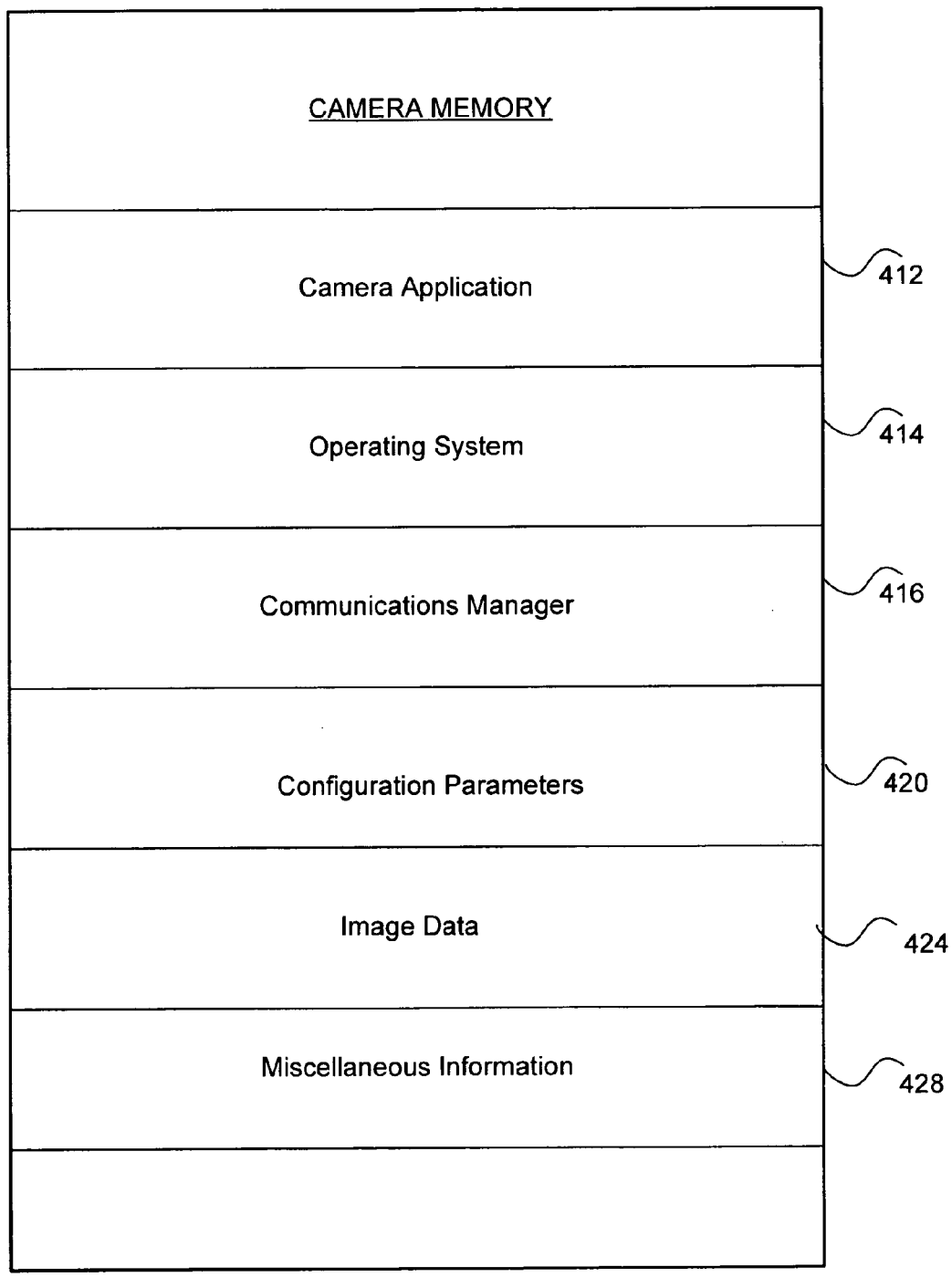
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a communications manager 416, configuration parameters 420, image data 424, and miscellaneous information. In alternate embodiments, memory 346 may readily include various other components in addition to, or instead of, those components discussed in conjunction with the FIG. 4 embodiment.

In the FIG. 4 embodiment, camera application 412 may include program instructions that are executed by CPU 344 (FIG. 3) to perform various functions and operations for camera device 110. The particular nature and functionality of camera application 412 varies depending upon factors such as the type and particular use of the corresponding camera device 110. In the FIG. 4 embodiment, operating system 414 preferably controls and coordinates low-level functionality of camera device 110.

In the FIG. 4 embodiment, camera 110 may utilize communications manager 416 to perform bi-directional communications with any external entity. Configuration parameters 420 may be selectively programmed by a system user to specify any desired functions or operating characteristics for camera 110. Image data 424 may include any appropriate type of information. For example, image data 424 may include raw captured image data, one or more image sequences, and processed image data. In the FIG. 4 embodiment, miscellaneous information 428 may include any additional types of information, data, or software instructions for camera 110. The utilization camera 110 is further discussed below in conjunction with FIG. 9.

Referring now to FIGS. 5A and 5B, diagrams illustrating an image processing procedure are shown, in accordance with one embodiment of the present invention. The FIG. 5 diagrams are presented for purposes of illustration, and in alternate embodiments, image processing procedures may include functions and techniques in addition to, or instead of, certain of those functions and techniques shown in the FIG. 5 example.

In the FIG. 5A diagram, two images (522 and 524) from an image sequence captured by camera 110 are shown. For purposes of simplicity, each image 522 and 524 is shown with only nine pixels (three horizontal and three vertical pixels) that are each represented as a square. However, any desired number of pixels may be utilized. Even though camera 110 may be aimed at a given target, due to slight movements by the camera user, images 522 and 524 are typically slightly offset with respect to each other.

The FIG. 5B diagram illustrates a image processing procedure performed when images 522 and 524 are transferred from camera 110 to server 122, as discussed above in conjunction with FIG. 1A. In certain embodiments, the image processing procedure may include, but is not limited to, a super-resolution procedure to create an enhanced image from the image sequence of original offset images 522 and 524.

As shown in FIG. 5B, since images 522 and 524 are slightly offset (by approximately one-half pixel, both horizontally and vertically), an image processor of server 122 may obtain additional image detail to create sub-pixels for populating the enhanced image. In the FIG. 5B example, there are four sub-pixels for each original pixel from images 522 and 524. The foregoing image processing procedure may thus create an enhanced image with a substantially greater number of pixels and improved resolution characteristics.

Figure 6:
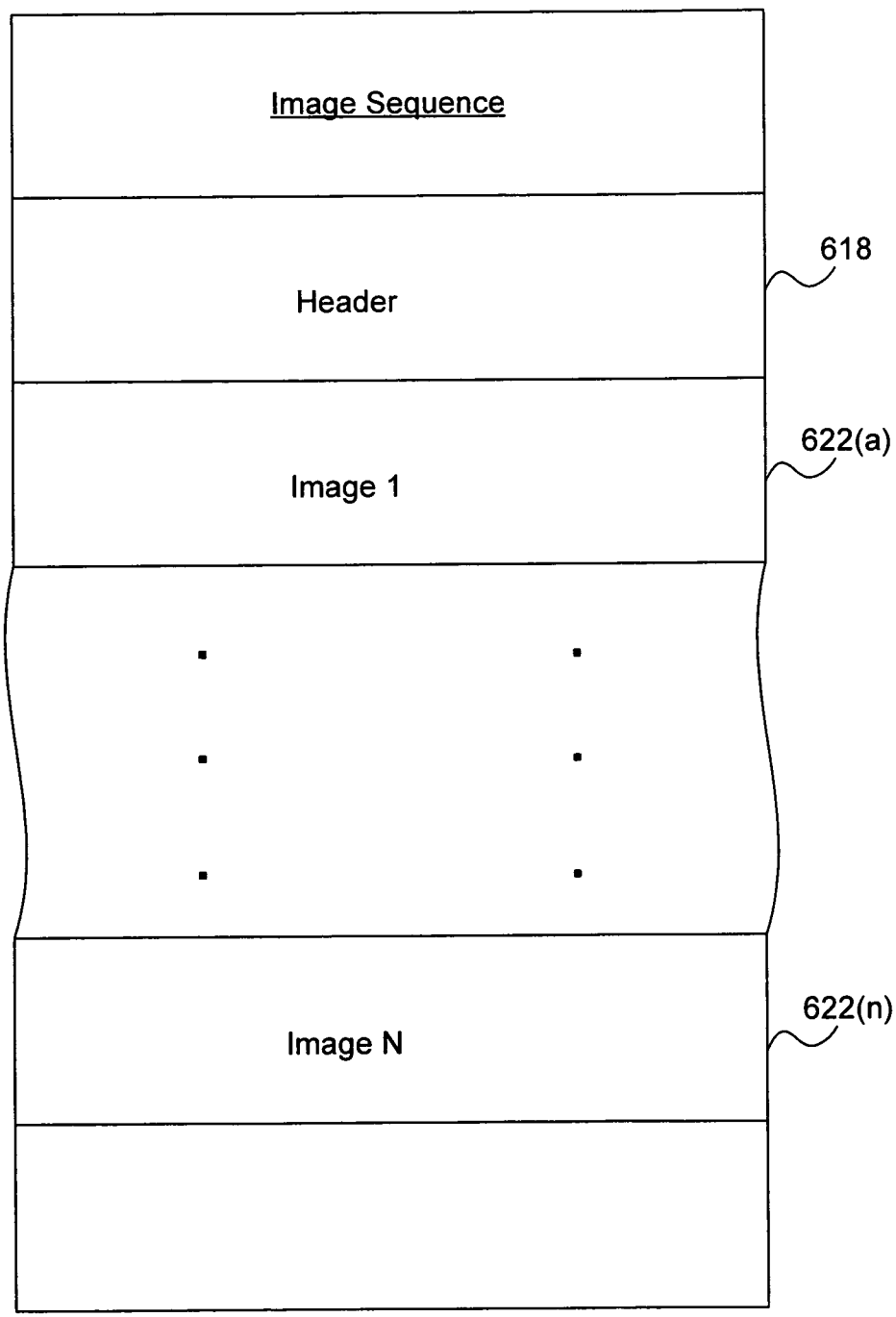
FIG. 6 is a diagram illustrating an image sequence, in accordance with one embodiment of the present invention.

Referring now to FIG. 6, a diagram illustrating an image sequence 614 is shown, in accordance with one embodiment of the present invention. In alternate embodiments, the present invention may utilize image sequences with various other configurations and components to implement image processing procedures.

In the FIG. 6 example, camera 110 (FIG. 1) may capture and transfer image sequence 614 to server 122 (FIG. 1) for performing image processing procedures, as discussed above in conjunction with FIG. 5. In the FIG. 6 embodiment, image sequence 614 includes a header 618 that includes any appropriate type of information. For example, header 618 may include an image sequence source identifier to indicate where image sequence 614 originated. Header 618 may also include an enhanced image destination identifier to indicate where server 122 should send an enhanced image created from image sequence 614. The capture and utilization of image sequences are further discussed below in conjunction with FIGS. 9-10.

Figure 7:
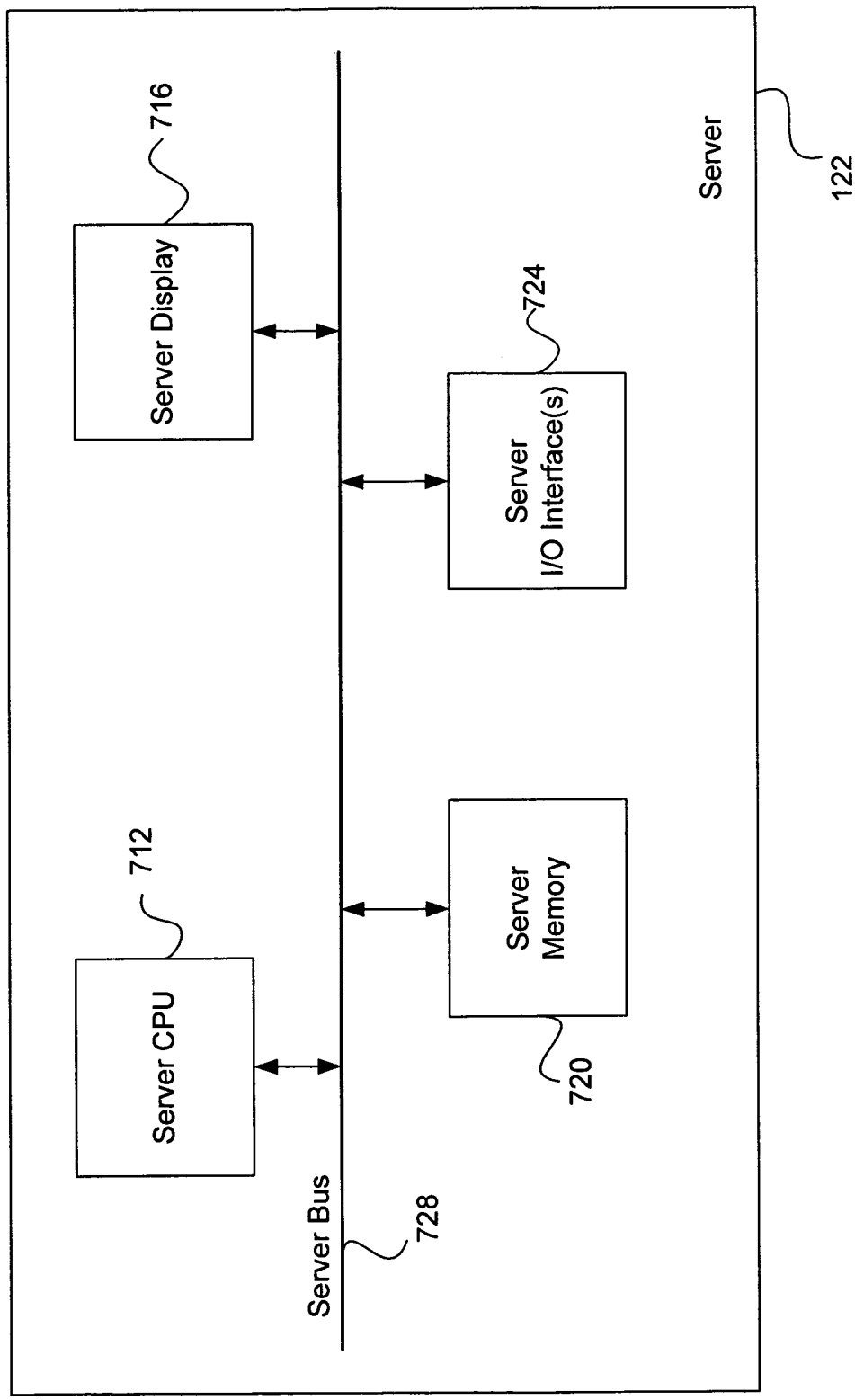
FIG. 7 is a block diagram of the server of FIG. 1A, in accordance with one embodiment of the present invention.

Referring now to FIG. 7, a block diagram for one embodiment of the FIG. 1A server 122 is shown, in accordance with the present invention. In the FIG. 7 embodiment, server 122 includes, but is not limited to, a server central processing unit (server CPU) 712, a server display 716, a server memory 720, and one or more server input/output interface(s) (server I/O interface(s)) 724. The foregoing components of server 122 may be coupled to, and communicate through, a server bus 728. In alternate embodiments, server 122 may alternately be implemented using components and configurations in addition to, or instead of, certain of those components and configurations discussed in conjunction with the FIG. 7 embodiment.

In the FIG. 7 embodiment, server CPU 712 may be implemented to include any appropriate and compatible microprocessor device that preferably executes software instructions to thereby control and manage the operation of server 118. The FIG. 7 server display 716 may include any effective type of display technology including a cathode-ray-tube monitor or a liquid-crystal display device with an appropriate screen for displaying various information to a server user. In the FIG. 7 embodiment, server memory 720 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 720 are further discussed below in conjunction with FIG. 8.

In the FIG. 7 embodiment, server I/O interface(s) 724 may include one or more input and/or output interfaces to receive and/or transmit any required types of information by server 122. Server I/O interface(s) 724 may include one or more means for allowing a server user to communicate with network 124. The implementation and utilization of server 122 is further discussed below in conjunction with FIG. 10.

Figure 8:
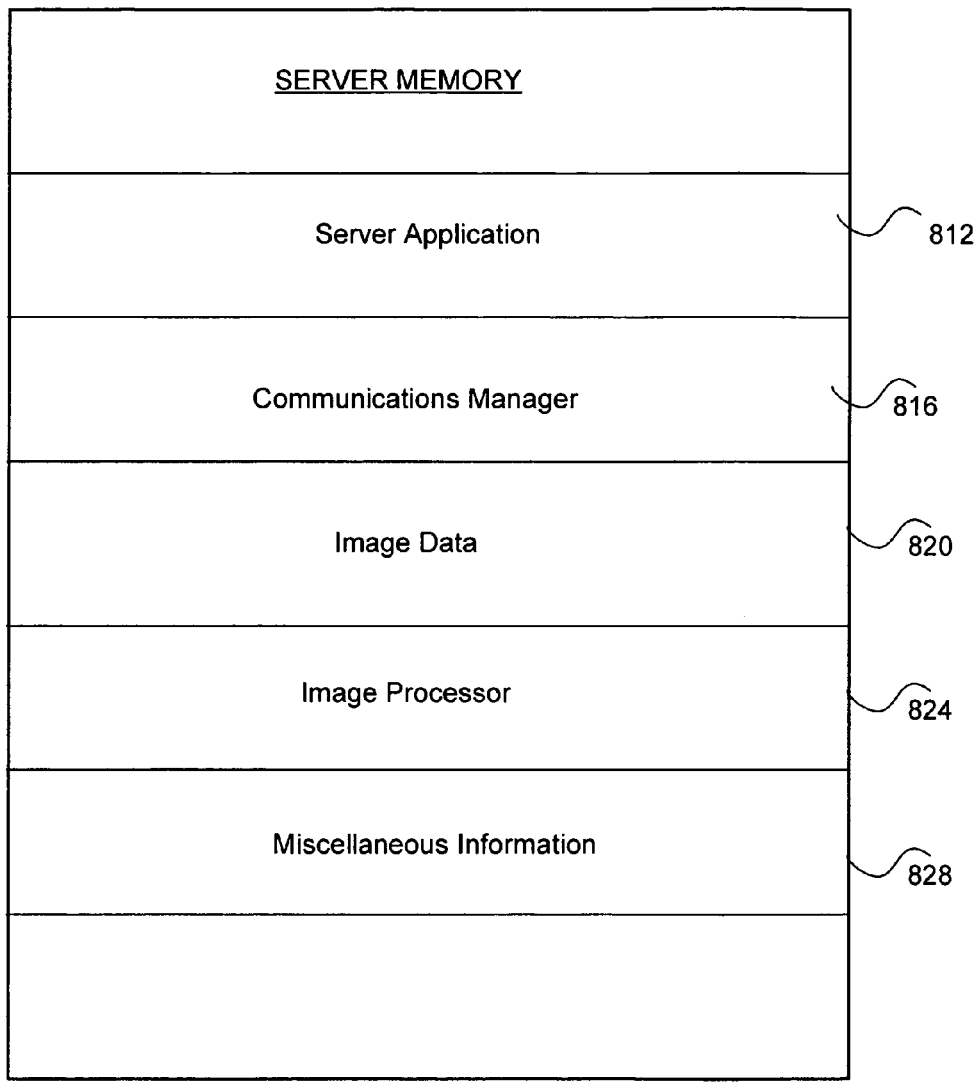
FIG. 8 is a diagram of the server memory of FIG. 7, in accordance with one embodiment of the present invention.

Referring now to FIG. 8, a block diagram for one embodiment of the FIG. 7 server memory 720 is shown, in accordance with the present invention. In the FIG. 8 embodiment, server memory 720 may include, but is not limited to, a server application 812, a communications manager 816, image data 820, an image processor 824, and miscellaneous information 828. In alternate embodiments, server memory 720 may include various other components and functionalities in addition to, or instead of, certain those components and functionalities discussed in conjunction with the FIG. 8 embodiment.

In the FIG. 8 embodiment, server application 812 may include program instructions that are preferably executed by server CPU 712 (FIG. 7) to perform various functions and operations for server 122. The particular nature and functionality of server application 812 typically varies depending upon factors such as the specific type and particular functionality of the corresponding server 122. In the FIG. 8 embodiment, server 122 may utilize communications manager 816 to perform bi-directional communications with any external entity. Image data 820 may include any appropriate type of information. For example, image data 820 may include raw captured image data, one or more image sequences, and processed/enhanced image data.

Server 122 may utilize image processor 824 to perform any appropriate types of image processing procedures on image data received from camera 110 (FIG. 1). For example, image processor 824 may perform a super-resolution processing procedure as discussed above in conjunction with FIG. 5. In addition, image processor 824 may perform any other image processing functions including, but not limited to, white balancing, red-eye correction, image smoothing, and image format conversions. In the FIG. 8 embodiment, miscellaneous information 828 may include any additional types of information, data, or software instructions for use by server 122. Additional details regarding the operation and implementation of server 122 are further discussed below in conjunction with FIG. 10.

Figure 9A:
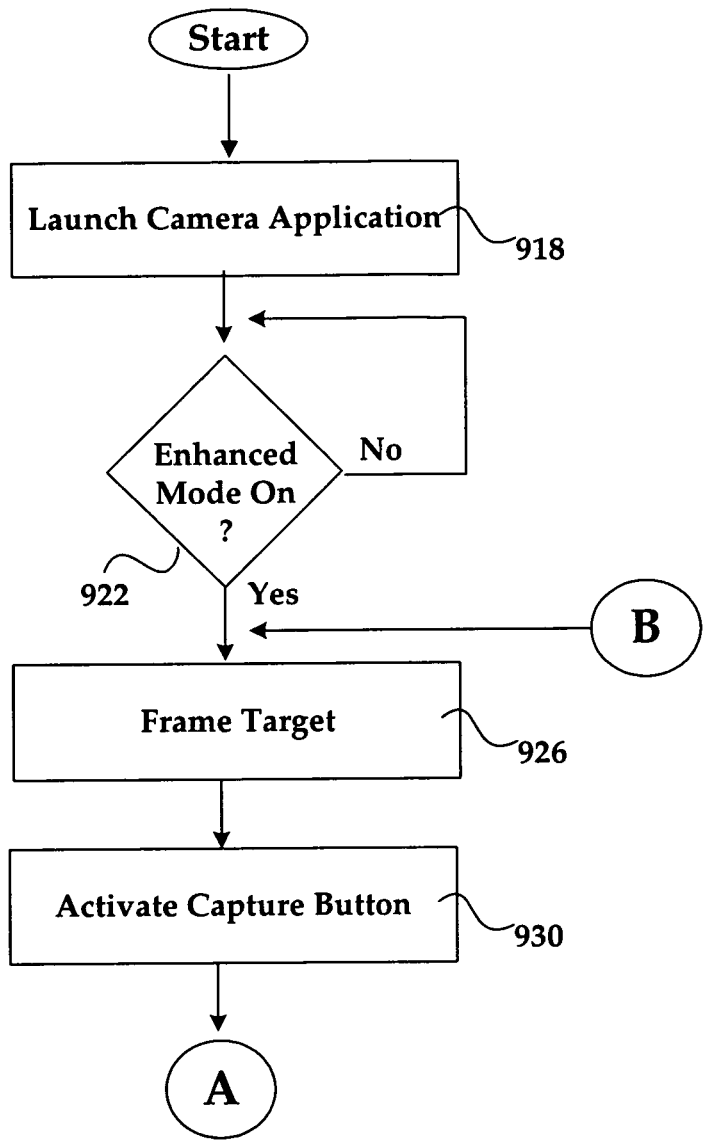
FIGS. 9A-9B are a flowchart of method steps for capturing an image sequence, in accordance with a one embodiment of the present invention.
Figure 9B:
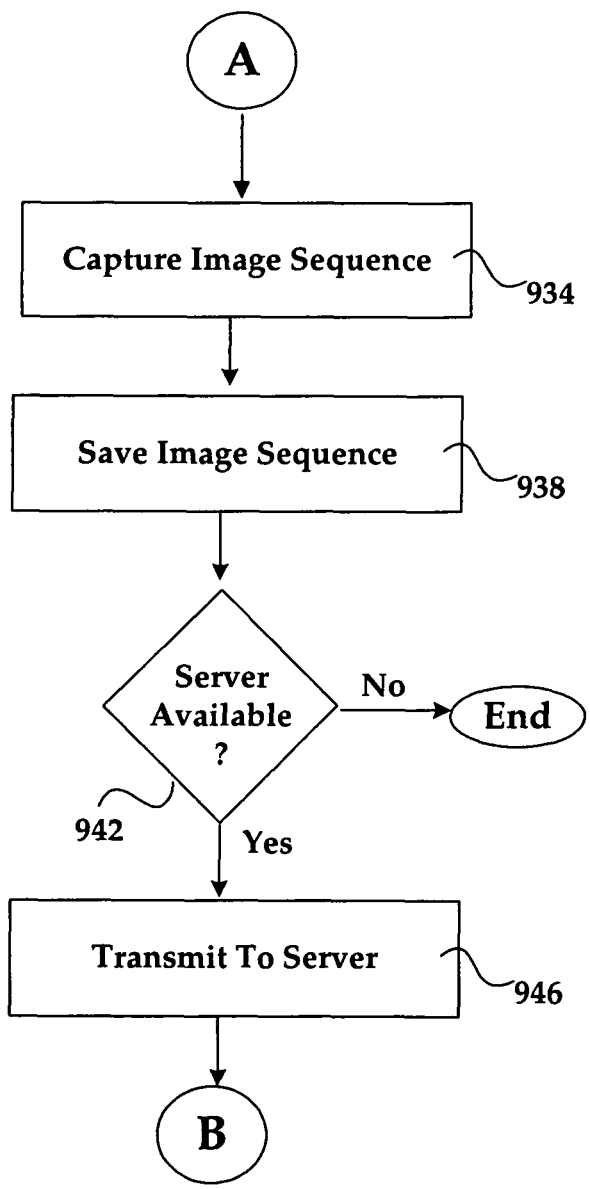

Referring now to FIGS. 9A-9B, a flowchart of method steps for capturing an image sequence 614 is shown, in accordance with one embodiment of the present invention. The FIG. 9 embodiment is presented for purposes of illustration, and in alternate embodiments, the present invention may readily utilize various other steps and sequences than those discussed in conjunction with the FIG. 9 embodiment.

In step 918 of FIG. 9A, a camera 110 initially launches a camera application program to begin normal camera functions. In step 922, camera 110 determines whether a enhanced image mode is currently activated. If the enhanced image mode is activated, then in step 926, a camera user may frame a selected photographic target by using a viewfinder of camera 110. In step 930, the camera user then activates an image capture button mounted on the exterior of camera 110. The FIG. 9A process then advances to step 934 of FIG. 9B through connecting letter "A."

In step 934, camera 110 automatically captures an image sequence 614 in response to the single activation of the image capture button in foregoing step 930. The image sequence 614 may include any desired number of similar, but slightly offset, images. For example, in certain embodiments, the image sequence 614 includes three or more images. In step 938, camera 110 determines whether an image processing server 122 is currently available for performing an image processing procedure on the captured image sequence 614.

Availability criteria for accessing server 122 may include, but are not limited to, sufficient network bandwidth, adequate server capacity, and the camera user having a valid processing service subscription. If server 122 is currently available for performing image processing on the image sequence 614, then in step 946, camera 110 transmits the captured image sequence 614 to server 122. The FIG. 9B process may then return to step 926 to capture and transmit additional image sequences to server 122.

Figure 10:
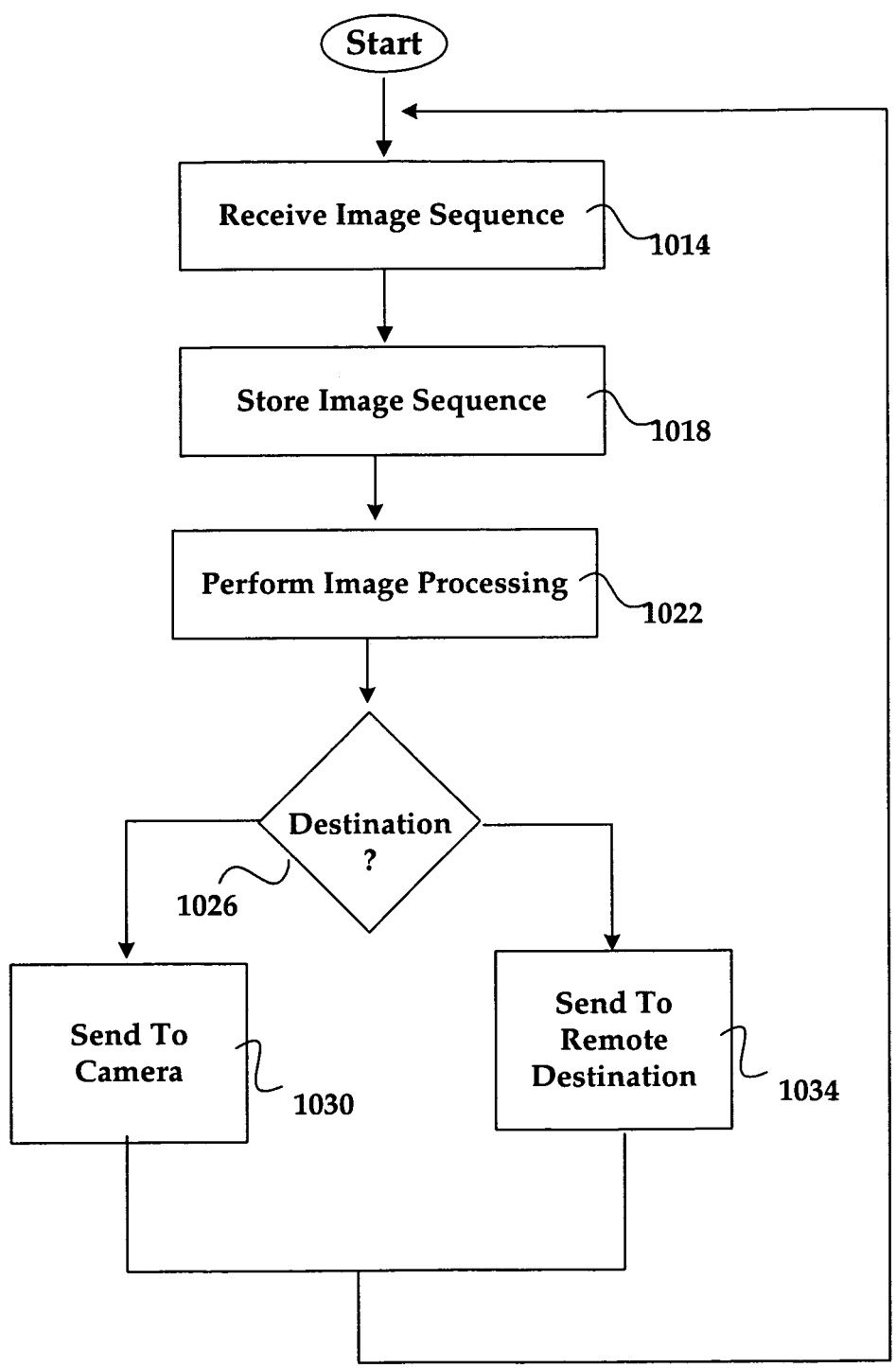
FIG. 10 is a flowchart of method steps for efficiently performing an image processing procedure, in accordance with a one embodiment of the present invention.

Referring now to FIG. 10, a flowchart of method steps for efficiently performing an image processing procedure is shown, in accordance with a second embodiment of the present invention. The FIG. 10 embodiment is presented for purposes of illustration, and in alternate embodiments, the present invention may readily utilize various other steps and sequences than those discussed in conjunction with the FIG. 10 embodiment.

In the FIG. 10 embodiment, in step 1014, an image processing server 122 initially receives an image sequence 614 from a camera 110 through an electronic network 124. In step 1018, the server 122 locally stores the received image sequence 614. Then, in step 1022, server 122 advantageously performs appropriate image processing operations on the received image sequence 614 to produce a corresponding enhanced image. In step 1026, server 122 determines an appropriate destination for the enhanced image by utilizing any effective techniques.

For example, a destination for the enhanced image may be previously specified in programmable user preferences, or server 122 may analyze a header 618 of received image sequence 614 to determine an appropriate destination for the corresponding enhanced image. In the FIG. 10 embodiment, server 122 may send the enhanced image back to camera 110 in step 1030, or may send the enhanced image to a remote computer destination in electronic network 124, as shown in step 1034. In alternate embodiments, server 124 may send the enhanced image to any specified destination. The FIG. 10 process may then return to step 1014 to create additional enhanced images in a similar manner. The present invention therefore provides an improved system and method for efficiently performing image processing operations.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image processing procedure, comprising:
    a server comprising one or more processors, said one or more processors being operable to:
        receive image data comprising a plurality of images captured by an imaging device, wherein at least one of said plurality of images is offset with respect to a preceding image of said plurality of images due to movement of said imaging device; and
        automatically perform an image processing operation to create an enhanced high-resolution image corresponding to said at least one of said plurality of images using sub-pixels of said at least one of said plurality of images and said preceding image of said plurality of images, wherein said enhanced high-resolution image is created by splitting pixels of said at least one of said plurality of images and said preceding image of said plurality of images into said sub-pixels.

2. The system of claim 1, wherein said imaging device is one of: a still camera, a video camcorder, or a cellular telephone.

3. The system of claim 1, wherein said image processing operation includes a super-resolution process to create said enhanced high-resolution image.

4. The system of claim 1, wherein said plurality of images is automatically captured in response to a single activation of an image capture button of said imaging device.

5. The system of claim 1, wherein said plurality of images comprises a header that specifies an origination device for said plurality of images and a destination device for said enhanced high-resolution image.

6. The system of claim 1, wherein said imaging device uses wireless technology to transfer said image data to said server.

7. The system of claim 1, wherein said imaging device transfers said image data to said server through an electronic network.

8. The system of claim 7, wherein said electronic network is an Internet network.

9. The system of claim 1, wherein said server transmits said enhanced high-resolution image back to said imaging device after performing said image processing operation.

10. The system of claim 1, wherein said server transmits said enhanced high-resolution image to a remote network device after performing said image processing operation.

11. The system of claim 1, wherein said server performs said image processing operation according to a premium service subscription.

12. The system of claim 1, wherein said imaging device transfers said image data to said server after determining that said server is currently available to perform said image processing operation.

13. The system of claim 1, wherein said image processing operation comprises a white balance processing operation and a red-eye processing operation for said image data.

14. The system of claim 1, wherein said image processing operation comprises a smoothing operation and a format conversion operation for said image data.

15. The system of claim 1, wherein said image processing operation is a resource-intensive procedure with respect to device bandwidth consumption and device memory requirements.

16. The system of claim 15, wherein said server performs said image processing operation on behalf of said imaging device.

17. The system of claim 16, wherein said imaging device is able to perform other processing tasks because said server performs said image processing operation.

18. The system of claim 1, wherein said server creates said enhanced-comprises image without combining said image data with an image template.

19. A method for performing an image processing procedure, comprising:
   receiving image data comprising a plurality of images captured by an imaging device, wherein at least one of said plurality of images is offset with respect to a preceding image of said plurality of images due to movement of said imaging device; and
   automatically performing an image processing operation to create an enhanced high-resolution image corresponding to said at least one of said plurality of images using sub-pixels of said at least one of said plurality of images and said preceding image of said plurality of images, wherein said enhanced high-resolution image is created by splitting pixels of said at least one of said plurality of images and said preceding image of said plurality of images into said sub-pixels.

* * * * *